United States Patent
Armbrust et al.

(10) Patent No.: US 12,517,905 B2
(45) Date of Patent: Jan. 6, 2026

(54) COMPILE TIME PROCESSING OF EXTRACT, TRANSFORM, LOAD PROCESS

(71) Applicant: Databricks, Inc., San Francisco, CA (US)

(72) Inventors: Michael Paul Armbrust, Berkeley, CA (US); Vuk Ercegovac, Campbell, CA (US); Paul Lappas, Seattle, WA (US); Xi Liang, Santa Clara, CA (US); Mukul Murthy, Berkeley, CA (US); Yannis Papakonstantinou, La Jolla, CA (US); Nitin Sharma, Sammamish, WA (US); John Sismanis, Campbell, CA (US); Joseph Torres, San Francisco, CA (US); Min Yang, Mountain View, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/608,779

(22) Filed: Mar. 18, 2024

(65) Prior Publication Data

US 2025/0217363 A1    Jul. 3, 2025

Related U.S. Application Data

(60) Provisional application No. 63/618,593, filed on Jan. 8, 2024.

(30) Foreign Application Priority Data

Jan. 3, 2024 (GR) .............................. 20240100005

(51) Int. Cl.
*G06F 16/00* (2019.01)
*G06F 16/2453* (2019.01)
(Continued)

(52) U.S. Cl.
CPC .... *G06F 16/24542* (2019.01); *G06F 16/2456* (2019.01); *G06F 16/24561* (2019.01); *G06F 16/24568* (2019.01); *G06F 16/254* (2019.01)

(58) Field of Classification Search
CPC ........ G06F 16/24526; G06F 16/24539; G06F 16/24561; G06F 8/20; G06F 1/00;
(Continued)

(56) References Cited

U.S. PATENT DOCUMENTS

| 2005/0138001 A1* | 6/2005 | Mittal | G06F 16/24539 |
| 2012/0197865 A1* | 8/2012 | Koch | G06F 16/24539 |
| | | | 707/E17.017 |
| 2023/0385277 A1* | 11/2023 | Schmidt | G06F 16/24544 |

* cited by examiner

*Primary Examiner* — Shyue Jiunn Hwa
(74) *Attorney, Agent, or Firm* — Fenwick & West LLP

(57) ABSTRACT

A system receives ETL specification for processing stream data, including a transform operation represented using a database query specification. The system generates a dataflow graph of a sequence of database queries by decomposing the database query into a first database query that generates an intermediate results table, and a second database query that receives as input the intermediate results table and outputs data used for performing the transform operation. The system executes the sequence of database queries for performing the transform operation on stream data received from the source. When receiving an incremental data set, the system determines an output change set based on the received incremental data set by traversing an execution plan and processing each operator in the execution plan, and computing a change set of a particular operator from the change sets output by the one or more other operators based on the incremental data set.

20 Claims, 9 Drawing Sheets

(51) Int. Cl.
*G06F 16/2455* (2019.01)
*G06F 16/25* (2019.01)

(58) Field of Classification Search
CPC ..... G06F 3/00; G06F 5/00; G06F 7/00; G06F 8/00; G06F 9/00; G06F 11/00; G06F 12/00; G06F 16/00; G06F 16/254; G06F 16/215; G06F 16/245; G06F 16/283; G06F 16/162; G06F 16/211; G06F 8/447; G06F 16/2282
See application file for complete search history.

COMPILE TIME PROCESSING OF EXTRACT, TRANSFORM, LOAD PROCESS

CROSS-REFERENCE TO RELATED APPLICATIONS

This application claims the benefit of and priority to Greek patent application No. 20240100005, filed Jan. 3, 2024, and U.S. Provisional Application No. 63/618,593, filed Jan. 8, 2024, which are hereby incorporated by reference in their entirety.

TECHNICAL FIELD

The disclosed configuration relates generally to databases, and more particularly to incrementalization while executing database queries specified using declarative database query languages.

BACKGROUND

Organizations often perform extract, transform, and load (ETL) of large amounts of data to a database from sources external to the database. The ETL process typically involves using scripts that cleanses and organizes the data being imported into the database. A system may implement ETL process that extracts data from source systems and performs checks, for example, to perform data validation and ensure that the data conforms to certain requirements. The input data from certain sources may be constantly changing, necessitating re-computation of the result tables produced by ETL. However, recomputing the results from scratch is often cost-prohibitive. To reduce the cost of keeping the result tables up to date, users employ a variety of manual strategies for incrementalization (i.e., updating the results of ETL while avoiding the cost of reprocessing old data) and spend inordinate amounts of time.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
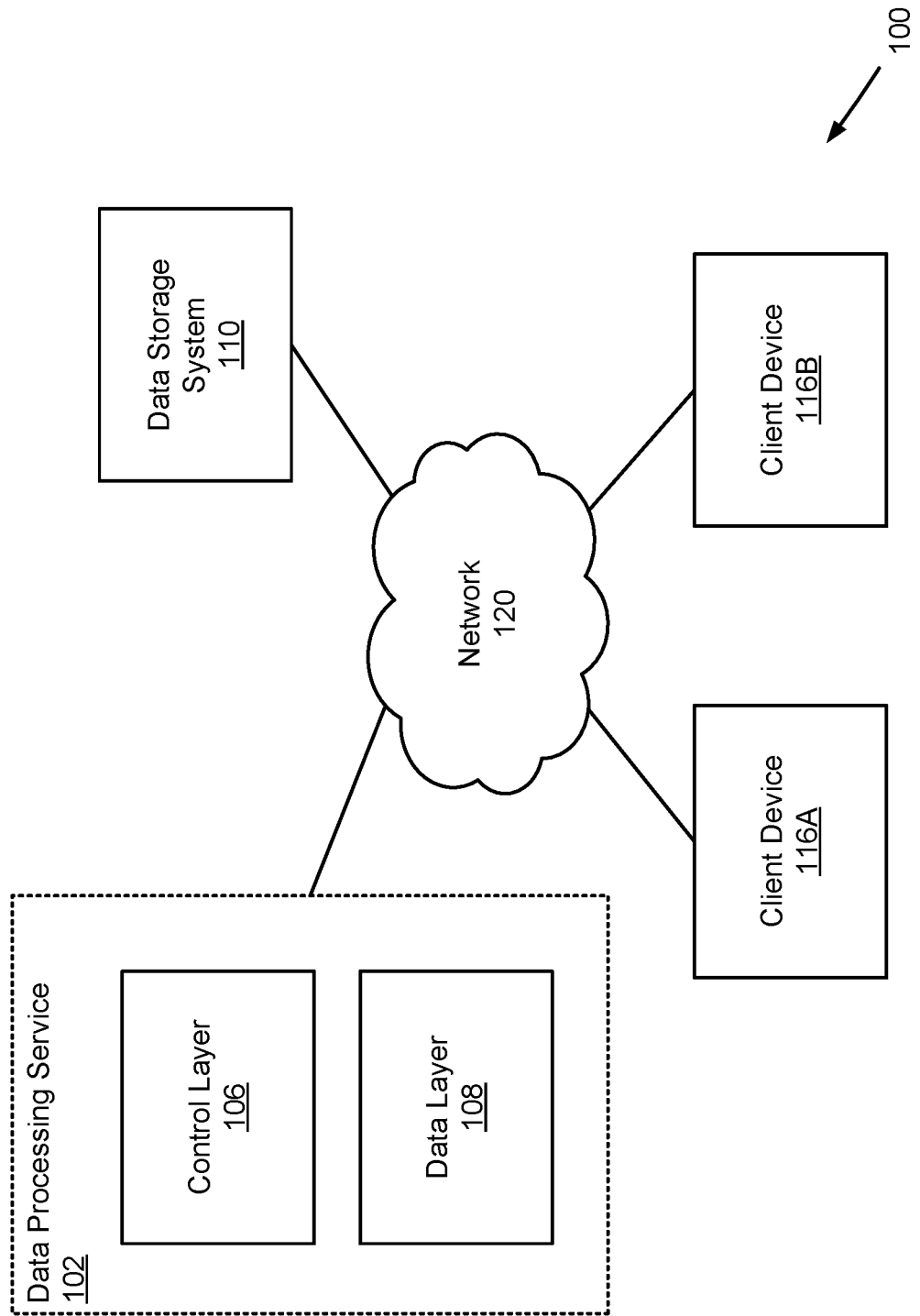
FIG. 1 is a high-level block diagram of a system environment for a data processing service, in accordance with an embodiment.

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A database system allows users to execute database queries specified using a database query language. According to an embodiment, the database query language is a declarative language such as the structured query language (SQL). Although the embodiments described herein use SQL as an exemplary database query language, the techniques disclosed herein are not limited to SQL. The database query language allows users to specify various types of operations such as a join operation, group by operation, aggregation operation (e.g., count, sum, maximum, minimum, average, and so on), mathematical operations (e.g., addition, subtraction, multiplication, division), and logical operations (e.g., AND, OR, NOT, and so on).

In one aspect, the configuration disclosed herein is related to an overall processing of an ETL operation. The transform step of the ETL operation is specified using SQL queries. An SQL query used in an ETL specification may be not executed as a standard database query but as specification for performing the transform step of the ETL operation for stream data in an incremental fashion. The system generates a dataflow graph by decomposing the SQL query into multiple SQL queries. An intermediate table including a specific set of columns is generated to store intermediate results needed for performing incremental processing of the stream data. The dataflow graph may be executed for stream data received from a source to incrementally update the results.

In another aspect, the configuration disclosed herein is related to a microarchitecture-based runtime execution of the ETL specification based on SQL queries used for specifying transform step of the ETL operation. The SQL query is compiled to generate an execution plan. The execution plan represents a graph of a set of operators (e.g., filter operator, select operator, join operator). The runtime execution of the ETL specification is performed by traversing the graph representation of the execution plan, and for each operator invoking a set of instructions that receive one or more change sets as input and generate a change set output for the operator. The traversal of the execution plan is performed in a recursive fashion and provides output change set generated on an operator as input to other operators and so on until the final change set output by the database query is generated.

In another aspect, the configuration disclosed herein concerns Continuous Integration Continuous Deployment (CICD) of the ETL specification. The transform step of the ETL operation in the ETL specification is specified using SQL queries. Developers may modify the SQL queries of the ETL specification and deploy the modified SQL query using CICD pipeline. A conventional system executes the modified SQL query on the entire data that has been received so far. If a developer makes frequent modifications to the ETL specification, this can be inefficient if a large amount of data has been read from the stream source. The configuration disclosed herein efficiently computes the result of transformation using the modified ETL specification. The system parses the SQL queries of the ETL specification and determines based on the changes submitted to the SQL queries whether the results need to be recomputed or left as they are. The system may determine based on the changes to the SQL queries that the modified SQL queries apply only to the new data that is received and the output computed using the previous data can be left as it is. The system may determine based on the changes to the SQL queries that some of the intermediate results determined during incrementalization may be reused and some of the output results need to be recomputed.

System Environment

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100. The computing systems of the system environment 100 may include some or all of the components (systems (or subsystems)) of a computer system 900 as described with FIG. 9.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

Figure 5:
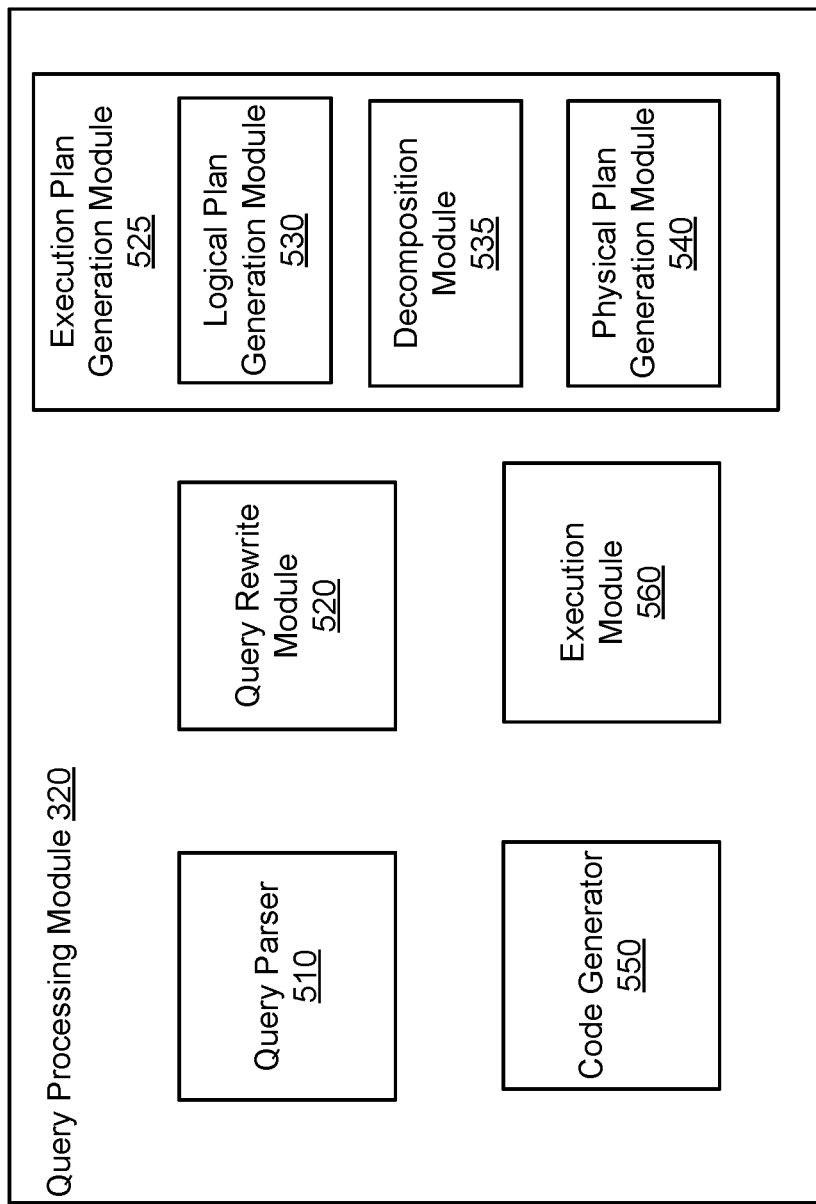
FIG. 5 is a block diagram of an architecture of a query processing module, in accordance with an embodiment.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 includes a query processing module as illustrated in FIG. 5 and described in relation to FIG. 5. The control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

The client devices 116 are computing devices that display information to users and communicate user actions to the systems of the system environment 100. While two client devices 116A, 116B are illustrated in FIG. 1, in practice many client devices 116 may communicate with the systems (e.g., data processing service 102 and/or data storage system 110) of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate with the various systems of the system environment 100 via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™.

Figure 2:
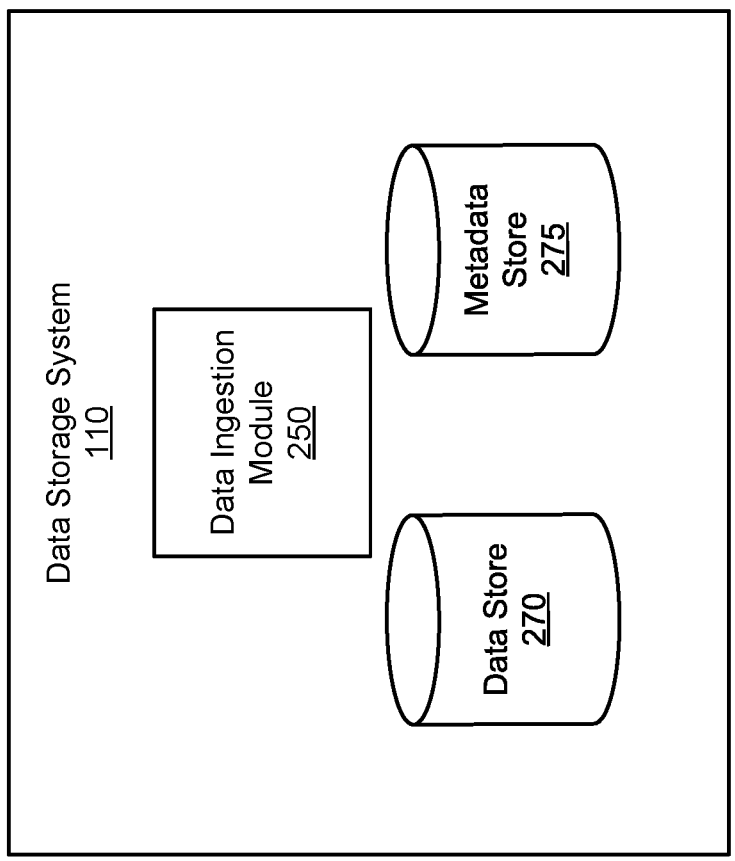
FIG. 2 illustrates a block diagram of an architecture of a data storage system, in accordance with an embodiment.

FIG. 2 is a block diagram of an architecture of a data storage system 110, in accordance with an embodiment. As shown, the data storage system 110 includes a data ingestion module 250, a data tables store 270 and a metadata store 275.

The data store 270 stores data associated with different tenants of the data processing service 102. In one embodiment, the data in the data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

Figure 3:
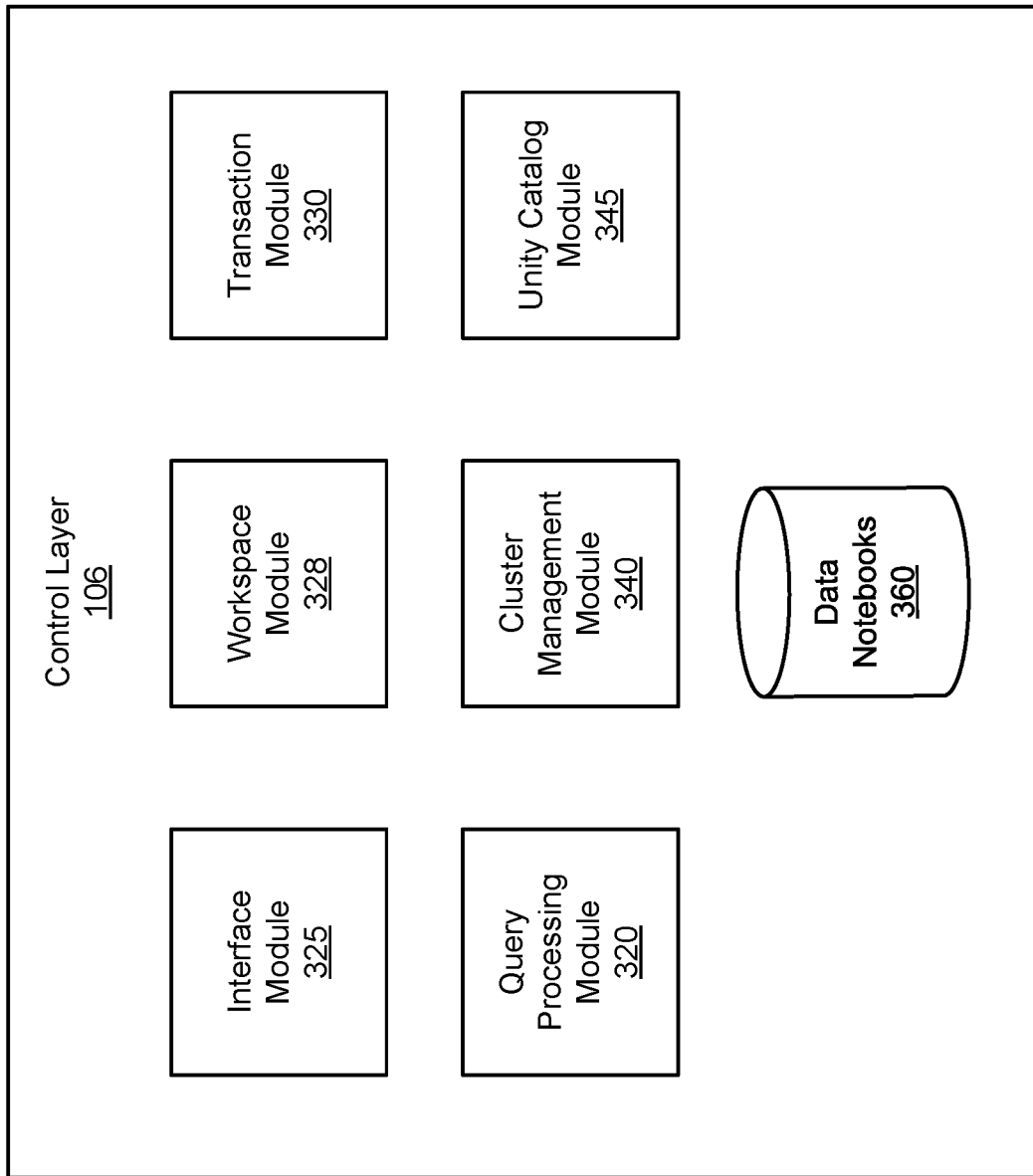
FIG. 3 illustrates a block diagram of an architecture of a control layer, in accordance with an embodiment.

FIG. 3 is a block diagram of an architecture of a control layer 106, in accordance with an embodiment. In one embodiment, the data processing service 102 includes an interface module 325, a transaction module 330, a query processing module 320, and a cluster management module 340. The control layer 106 also includes a data notebook store 360. The modules 325, 330, 320, and 340 may be structured for execution by a computer system, e.g., 900 having some or all of the components as described in FIG. 9, such that the computer system 900 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces.

In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 320 receives and processes queries that access data stored by the data storage system 110. The query processing module 320 may reside in the control layer 106. The queries processed by the query processing module 320 are referred to herein as database queries. The database queries are specified using a declarative database query language such as the SQL. The query processing module 320 compiles a database query specified using the declarative database query language to generate executable code that is executed. The query processing module 320 may encounter runtime errors during execution of a database query and returns information describing the runtime error including an origin of the runtime error representing a position of the runtime error in the database query. In one embodiment, the query processing module 320 provides one or more queries to appropriate clusters of the data layer 108, and receives responses to the queries from clusters in which the queries are executed.

The unity catalog module 345 is a fine-grained governance solution for managing assets within the data processing service 102. It helps simplify security and governance by providing a central place to administer and audit data access. In one embodiment, the unity catalog module 345 maintains a metastore for a respective account. A metastore is a top-level container of objects for the account. The metastore may store data objects and the permissions that govern access to the objects. A metastore for an account can be assigned to one or more workspaces associated with the account. In one embodiment, the unity catalog module 345 organizes data as a three-level namespace, a catalogue is the first layer, a schema (also called a database) is the second layer, and tables and views are the third layer.

In one embodiment, the unity catalog module 345 enables read and write of data to data stored in cloud storage of the data storage system 110 on behalf of users associated with an account and/or workspace. In one instance, the unity catalog module 345 manages storage credentials and external locations. A storage credential represents an authentication and authorization mechanism for accessing data stored on the data storage system 110. Each storage credential may be subject to access-control policies that control which users and groups can access the credential. An external location is an object that combines a cloud storage path (e.g., storage path in the data storage system 110) with a storage credential that authorizes access to the cloud storage path. Each storage location is subject to access-control policies that control which users and groups can access the storage credential. Therefore, if a user does not have access to a storage credential in the unity catalog module 345, the unity catalog module 345 does not attempt to authenticate to the data storage system 110.

In one embodiment, the unity catalog module 345 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider with one or more recipient entities.

Responsive to receiving a request from a provider to share one or more tables (or other data objects), the unity catalog module 345 creates a share in the metastore of the provider. A share is a securable object registered in the metastore for a provider. A share contains tables and notebook files from the provider metastore that the provider would like to share with a recipient. A recipient object is an object that associates an organization with a credential or secure sharing identifier allowing that organization to access one or more shares of the provider. In one embodiment, a provider can define multiple recipients for a given metastore. The unity catalog module 345 in turn may create a provider object in the metastore of the recipient that stores information on the provider and the tables that the provider has shared with the recipient. In this manner, a user associated with a provider entity can securely share tables of the provider entity that are stored in a dedicated cloud storage location in the data storage system 110 with users of a recipient entity by configuring shared access in the metastore.

Figure 4:
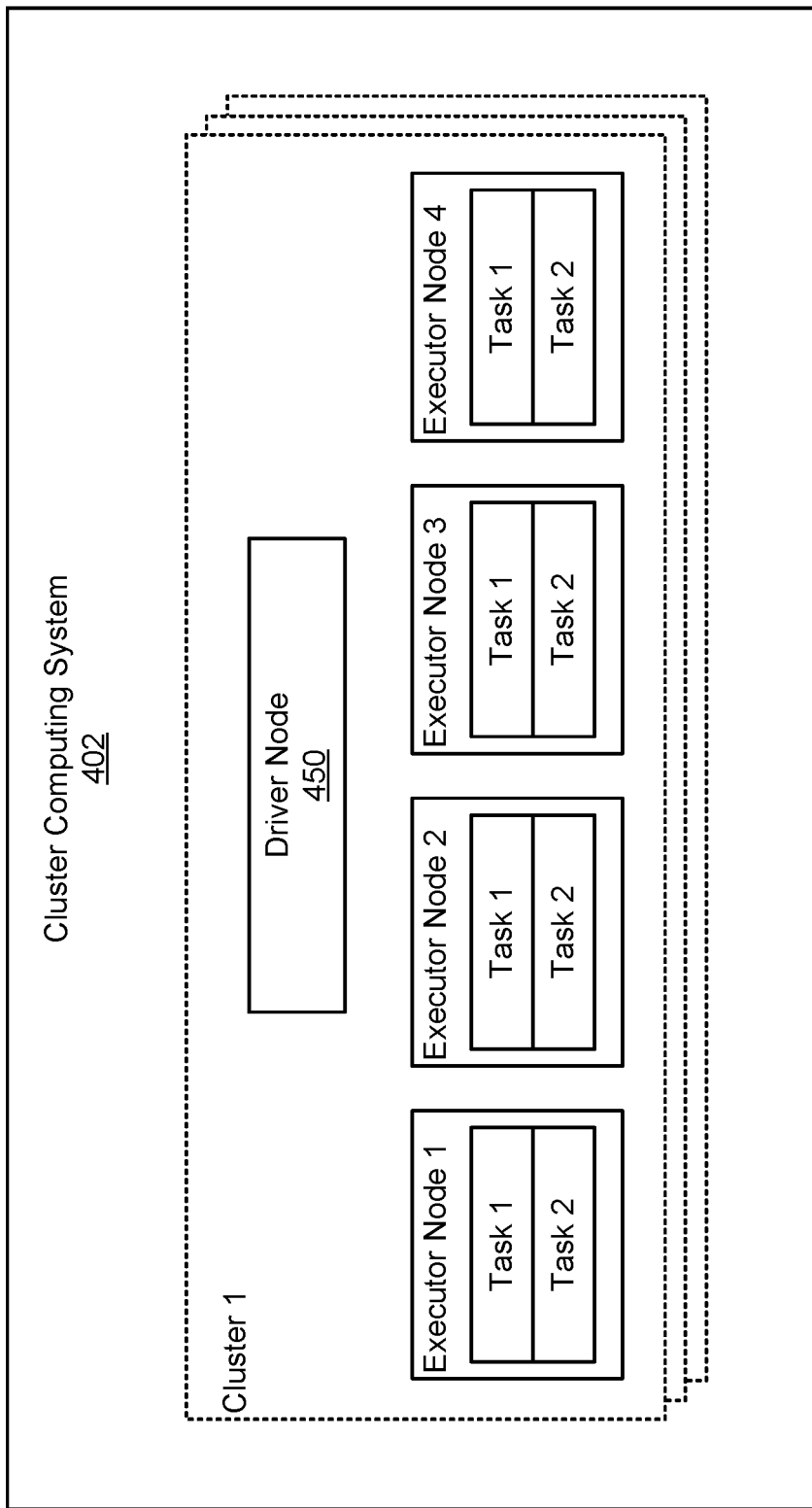
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes. The nodes may be structured for execution by a computer system, e.g., 900 having some or all of the components as described in FIG. 9, such that the computer system 900 operates in a specified manner as per the described functionality.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 320.

The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

System Architecture of Query Processing Module

FIG. 5 is a block diagram of a query processing module, in accordance with an embodiment. The query processing module 320 performs query processing and also includes instructions for incrementalization of ETL process. In one instance, the driver node 450 includes a query parser 510, a query rewrite module 520, an execution module 525 which includes a logical plan generation module 530, a decomposition module 535, and a physical plan generation module 540. The modules and nodes may be structured for execution by a computer system, e.g., 900 having some or all of the components as described in FIG. 9, such that the computer system 900 operates in a specified manner as per the described functionality.

The query parser 510 receives a database query for processing and parses the database query. The database query is specified using a declarative database query language such as SQL. The query parser 510 parses the database query to identify various tokens of the database query and build a data structure representation of the database query. The data structure representation identifies various components of the database query, for example, any SELECT expressions that are returned by the database query, tables that are input to the query, a conditional clause of the database query, a group by clause, and so on. According to an embodiment, the data structure representation of the database query is a graph model based on the database query.

The query rewrite module 520 performs transformations of the database query, for example, to improve the execution of the query. The improvement may be in terms of execution time, memory utilization, or other resource utilization. A database query may process one or more tables that store a significant number of records that are processed by the database query. Since the declarative database query language does not specify the procedure for determining the result of the database query, there are various possible procedures for executing the database query.

The query rewrite module 520 may transform the query to change the order of processing of certain steps, for example, by changing the order in which tables are joined, by changing the order in which certain operations such as filtering of records of a table is performed in relation to other operations. The query rewrite module 520 may transform the database query to cause certain temporary results to be materialized. The query rewrite module 520 may eliminate certain operations if the operations are determined to be redundant. The query rewrite module 520 may transform a database query so that certain computations such as subqueries or expressions are shared. The query rewrite module 520 may transform the database query to pushdown certain computations, for example, by changing the order in which certain predicates are applied to the computation as early as possible. The query rewrite module 520 may transform the database query to modify certain predicates to use more optimized versions of the predicates that are computationally equivalent but provide better performance.

In some embodiments, the query processing module 320 receives an extract-transform-load (ETL) operation. The ETL operation may include specification for processing the input data received from an external system, for example, stream data. In some embodiments, the ETL specification may include a transform operation represented using at least a database query specification (e.g., SQL query) for transforming the stream data. In some embodiments, an SQL query used in an ETL specification may be not executed as a standard database query. In some implementations, an SQL query may be used as a specification for performing the transform step of the ETL operation for stream data in an incremental fashion.

The execution plan generation module 525 generates execution plans for executing the database query for performing the transform step of the ETL operation for stream data in an incremental fashion. The execution plan represents a set of operations generated by the query processing module 320 from a database query to process data as specified by the database query and return the results requested. According to an embodiment, the execution plan is represented as a tree data structure or a graph data structure (e.g., a directed acyclic graph) where the nodes are various operators that perform specific computations needed. An execution plan may be a logical plan or a physical plan. The execution plan generation module 525 includes a logical plan generation module 530, a decomposition module 535, and a physical plan generation module 540. In some embodiments, the execution plan generation module 525 may generate a dataflow graph for executing the transform operation. In some embodiments, the dataflow graph may be executed for stream data received from a data source to incrementally update results.

The logical plan generation module 530 generates a logical plan for the database query. The logical plan includes representation of the various steps that need to be executed for processing the database query. According to an embodiment, the logical plan generation module 530 generates an unresolved logical plan based on the transformed query graph representation. Various relation names (or table names) and column names may not be resolved in an unresolved logical plan. The logical plan generation module 530 generates a resolved logical plan from the unresolved logical plan by resolving the relation names and column names in the unresolved logical plan. The logical plan generation module 530 further optimizes the resolved logical plan to obtain an optimized logical plan.

The decomposition module 535 decomposes a database query into one or more incrementalizable database queries. In some embodiments, a database query may not be able to perform incremental ETL of input data as is and needs to be modified. The decomposition module 535 may decompose the database query into multiple decomposed database queries so that at least one of the decomposed database queries may perform an operation on stream data in an incremental way (e.g., an incremental operation). In some embodiments, a set of incremental operations may be predefined. The predefined set of operations includes one or more operations that correspond to a partition-based dataflow, an append-only dataflow, or a row ID based flow. The decomposition module 535 may traverse the database query specification to determine whether the database query specification includes one or more incremental operations from the set of predefined incremental operations.

For example, the decomposition module 535 may decompose a database query into a first database query and a second database query. The first database query may generate an intermediate results table. The data stored in the intermediate results table is determined based on the incremental operation. The second database query may receive the intermediate results table as an input, and outputs data as a result of the database query. In some implementations, the output of the second database may be used for performing other database queries. For example, a database query which is an SQL query includes a "COUNT DISTINCT" operation, the decomposition module 535 may decompose the SQL query to generate an intermediate results table. A specific set of columns in the intermediate results table may be used to store intermediate results needed for performing incremental processing of stream data.

In some embodiments, the decomposition module 535 may decompose a database query into a sequence of incremental operations, and the original logical plan may be decomposed into a sequence of decomposed logical plans. In some embodiments, at least one of the sequences of the decomposed logical plans may be incrementally maintained and reconciled. Reconciliation query may act as a view over the decomposed materializations to return the desired result of the original database query.

The physical plan generation module 540 generates a physical plan from the logical plan generated by the logical plan generation module 530. The physical plan specifies details of how the logical plan is executed by the data processing service 102. The physical plan generation module 540 may generate different physical plans for the same logical plan and evaluate each physical plan using a cost model to select the optimal physical plan for execution. The physical plan further specifies details of various operations of the logical plan. As an example, if the logical plan includes a join operator, the physical plan may specify the type of join that should be performed for implementing the join operator. For example, the physical plan may specify whether the join operator should be implemented as a hash join, merge join, or sort join, and so on. The physical plan may be specific to a database system, whereas the logical plan may be independent of database systems and may be executed on any target database system by converting to a physical plan for that target database system.

Compile Time Processing of ETL Specification

The execution plan generation module 525 may generate a dataflow graph for executing a transform operation. In some embodiments, the transform operation may be represented using at least a database query specification (e.g., an SQL specification). The dataflow graph may include a sequence of database queries which are decomposed based on the database query specification. In some implementations, the sequency of database queries may include one or more incremental operations. For example, the sequence of database queries may include a first database query that generates an intermediate results table, which stores data determined based on the incremental operation, and a second database query that receives as input the intermediate results table and outputs data used for performing the transform step of the ETL operation.

In some embodiments, the query processing module 320 may perform continuous integration continuous deployment (CICD) of ETL specification. For example, the original ETL specification may be modified, and the dataflow graph for executing the original transform operation may be not suitable for the transform operation in the modified ETL specification. The modified ETL specification may include modified database queries (e.g., SQL queries) which are deployed using the CICD pipeline. In some embodiments, the query processing module 320 may generate new/modified execution plan based on the modified database queries. Alternatively, the query parser 510 may parse the database query in the modified ETL specification, and the execution plan generation module 525 may determine, based on the changes in the database queries, whether the previous results need to be recomputed or left as they are. In some embodiments, the execution plan generation module 525 may determine that the modified database queries apply only to the new data that is received and the output computed using the previous data can be left as it is. In some embodiments, the execution plan generation module 525 may determine that some of the intermediate results determined during incrementalization may be reused and some of the output results need to be recomputed.

The code generator 550 generates code representing executable instructions for implementing the physical plan for executing a database query. The generated code includes a set of instructions for each operator specified in the execution plan. The generated code is specified using a programming language that may be compiled and executed.

The execution module 560 executes the generated code corresponding to the database query. The execution module 560 accesses the data stored in the data storage system 110 as specified by the database query and performs the various instructions as specified by the generated code to return the results according to the database query. For example, if the database query processes records of a table, the execution module 560 may access records of the database table from the data storage system 110 and process each record as specified by the database query. Once the dataflow graph is generated, when receiving stream data from a data source, the execution module 560 may execute the sequence of database queries of the dataflow graph for performing the transform operation on the stream data received from the data source.

In one example, an original database query is used to calculate an average of a column of data, and its corresponding logic plan may include: "Create Live Table A as SELECT col1, AVG(col2) as avg from Table B GROUP BY by col1." This original database query is not incrementalizable as when the source data table "Table B" changes, the result (e.g., average of col1) cannot be computed only based on the changes (e.g., insert/update/deletes). The decomposition module 535 may traverse the original database query specification to determine the original database query specification includes a predefined incremental operation, e.g., SUM. The decomposition module 535 may decompose the original database query into a first database query and a second database query, e.g., a "SUM" operation and a division operation. In this way, the "SUM" operation may generate intermediate results that are stored in an intermediate results table, e.g., materialized. The corresponding logic plan may be: "Create Live Table A_mat as SELECT col1, SUM (col2) as s, COUNT (col2) as c from Table B GROUP BY by col1." The intermediate results are materialized in Live Table A_mat, which may be incrementally maintained. Any change in the intermediate results that is caused by the changes in the source data table "Table B" may be determined by applying the "SUM" operation to the changes in the source data table "Table B," and the change in the intermediate results may be merged into the previous state of the materialized Live Table A_mat. To perform the original database query to calculate the average, the execution module 560 may input the intermediate results table into the second database query for reconciliation. For example, the corresponding logic plan may be: "Create Live View A as SELECT col1, (s/c) as avg FROM A_mat." The reconciliation view is the desired view of the original database query.

Microarchitecture Based Runtime Execution of ETL Specification

In some embodiments, the execution module 560 may perform a microarchitecture-based runtime execution of the ETL specification based on the execution plan. The execution plan represents a graph of a set of operators (e.g., filter operator, select operator, join operator). The execution module 560 may travers the graph representation of the execution plan. In some embodiments, the execution module 560 may identify one or more operators in the execution plan corresponding to incremental operations. For example, an incremental change set in the input data (e.g., the stream data) may cause the one or more operators to generate a change set in the output result. In some embodiments, for each of the one or more operators, the execution module 560 may invoke a set of instructions that receive one or more change sets as input and generate a change set output for the operator. In some embodiments, a particular operator may receive inputs of one or more operators. For example, the particular operator may receive change sets output by one or more other operators as input, and compute the change set of the particular operator from the change sets output by the one or more other operators. The execution module 560 may determine an output change set by processing the one or more operators based on received incremental stream data. The execution module 560 may determine the result of processing the data stream by applying the change set to the previous results of execution of the execution plan.

In one implementation, the execution plan may include an operator that corresponds to a partition-based flow. For example, an ETL specification may include a database query that requires extracting data from a source (e.g., "Table A") for a specific date range, transforming the extracted data (e.g., "Sales"), and loading the transformed data into a destination table (e.g., "Table B") with partitions based on a specific column (e.g., "Date"). The execution module 560 may identify that this operation corresponds to a partition-based flow. When receiving an initial set of stream data, the execution module 560 may apply the operator to the initial set of stream data, obtain an intermediate result (e.g., "Sales" data portioned based on "Date"), and materialize the intermediate result in an intermediate results table. When receiving an incremental set of stream data, the execution module 560 may apply the operator on the incremental set of stream data and obtain a change set output. The execution module 560 may combine the intermediate result in the intermediate results table with the change set output to obtain a result of the execution plan.

In another implementation, the execution plan may include an operator that corresponds to an append-only flow. Take the above discussed database query for calculating an average of a column of data as an example. The execution plan generation module 525 may decompose the original database query and generate an execution plan that includes a first database query and a second database query. The first database query may include a first operator "SUM" and a second operator "COUNT," both of which correspond to "append-only" flows. When receiving an initial set of stream data, the execution module 560 may apply the first and second operator to the initial set of stream data, and obtains "s" as an intermediate result of "SUM" and "c" as an intermediate result of "COUNT." The average may be calculated by "s/c." The execution module 560 may store the intermediate results "s" and "c" in an intermediate results table, e.g., "Live Table A_mat." When receiving an incremental set of the stream data, the execution module 560 may use the incremental set of stream data as a change set input, and apply the first and second operators to the change set input. The change set output of the first operator may be $\Delta s$, and the change set output of the second operator may be $\Delta c$. The execution module 560 may determine an updated result of "SUM" using the previous intermediate result and the change set output, i.e., "s+$\Delta s$." Similarly, the execution module 560 may determine an updated result of "COUNT" using the previous intermediate result and the change set output, i.e., "s+$\Delta c$." The execution module 560 may use the updated results of each operator to determine the result of processing the data stream with the execution plan. For example, the execution module 560 may determine an update result as "(s+$\Delta s$)/(c+$\Delta c$)" as a result of execution of the database query.

In another example, the execution plan may include an operator that corresponds to a row ID based flow. For example, an ETL specification may include a database query that requires obtaining data in source data based on a unique identifier (e.g., row ID=xxx1, xxx2, xxx3, etc.). The execution module 560 may identify that this operation corresponds to a row ID based flow. When receiving an initial set of stream data, the execution module 560 may apply the operator to the initial set of stream data, obtain an intermediate result (e.g., data corresponding to row ID "xxx1," "xxx2," "xxx3," etc.), and materialize the intermediate result in an intermediate results table. When receiving an incremental set of stream data, the execution module 560 may apply the operator on the incremental set of stream data and obtain a change set output. For example, the execution module 560 may identify whether the incremental data set includes data having row ID "xxx1." If there is a match of the row ID, the execution module 560 may obtain the corresponding data in the incremental data set as a change set output, and merge the change set output into the row with row ID "xxx1" in the intermediate results table. If no match of row ID (e.g., "xxx1") between a row in the incremental data set and the intermediate results is identified, the execution module 560 may determine the data corresponding the new row ID (e.g., "xxx0") as a change set output and add the change output as a new row ("xxx0") in the destination table as a result of the execution plan.

In some embodiments, the traversal of the execution plan is performed in a recursive fashion and provides output change set generated on an operator as input to other operators and so on until the final change set output by the database query is generated. For example, an execution plan may include a combination of joins and left joins operators. In some instances, the joins operators may be unions operators, and the execution plan may end with an aggregation operator.

Figure 6:
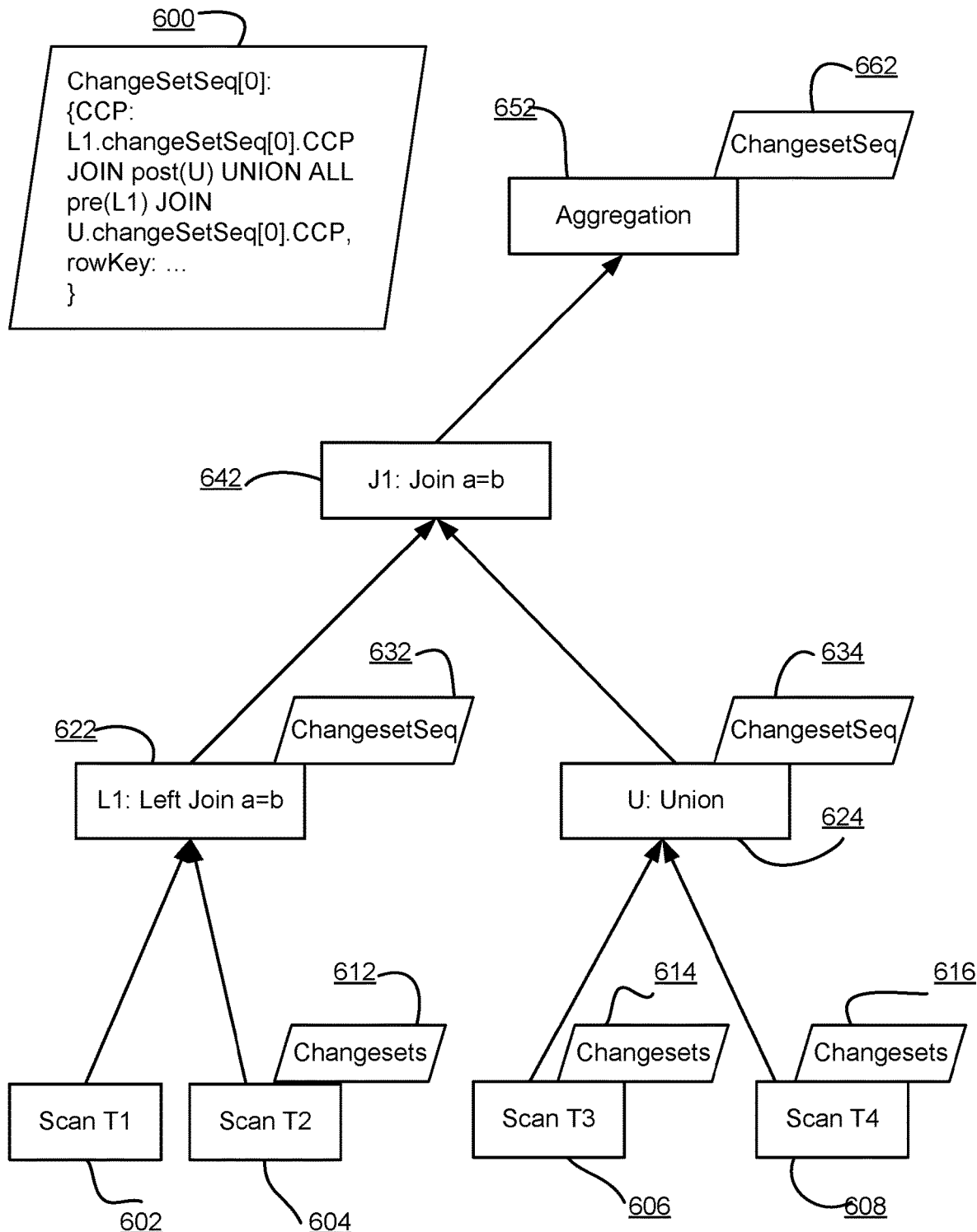
FIG. 6 is a graphical illustration of an exemplary execution plan with change set sequence, in accordance with an embodiment.

FIG. 6 is a graphical illustration of an exemplary execution plan with change set sequence, in accordance with an embodiment. An execution plan 600 may be represented in a structural graph that the output change set generated on an operator may be used as input to other operators. As shown in FIG. 6, the execution plan 600 includes a join operator (node J1) 642, a left join operator (L1) 622, a union operator (U) 624, an aggregation operator 652, and a plurality of Scan operators, e.g., Scan T1 (602) to Scan T4 (608). In this example, the operator Scan T2 (604) is an incremental operator. When receiving an incremental data set of the stream data, the operator Scan T2 (604) may output a change set 612. The operator L1 (622) will take the change set 612 as input and performs an incremental operation to output its corresponding change set. The operator L1 (622)'s output change set may be referred to as change set sequence 632 as it is an output based on the change set 612. The output of operator L1 (622) may be input to the operator J1 (642) and further input into the operator Aggregation 652 to output a change set sequence 662. Similar processing may be applied to the Scan T3 (606) and Scan T4 (608) branches. In this way, the execution module 560 may traverse the execution plan in a recursive fashion and output change set generated on an operator as input to other operators and obtain a final output change set by processing an incremental data set of the stream data. By integrating the final output change set with the previous results stored in the intermediate results table, the execution module 560 may obtain a result of execution of the original database query in the ETL specification.

Processing of ETL Operation Using Incremental Operations

Figure 7:
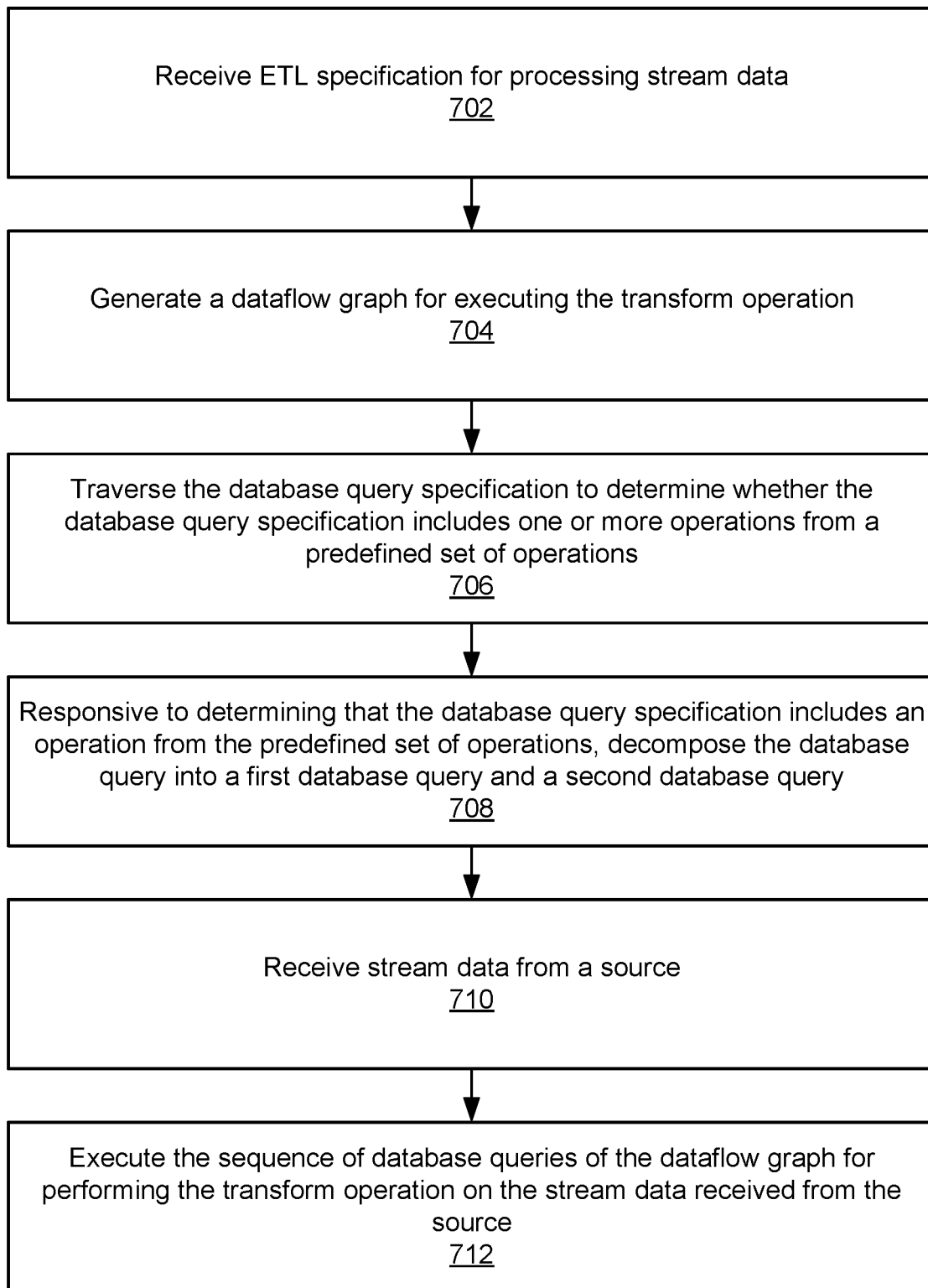
FIG. 7 is a flowchart of a method for processing an ETL operation using incremental operations, in accordance with an embodiment.

FIG. 7 is a flowchart of a method for processing an ETL operation using incremental operations, in accordance with an embodiment. The process shown in FIG. 7 may be performed by one or more components (e.g., the control layer 106) of a data processing system/service (e.g., the data processing service 102). Other entities may perform some or all of the steps in FIG. 7. The data processing service 102 as well as the other entities may include some or of the component of the machine (e.g., computer system) described in conjunction with FIG. 9. Embodiments may include different and/or additional steps, or perform the steps in different orders.

The query processing module 320 receives ETL specification for processing stream data. The ETL specification may include a transform operation represented using at least a database query specification for transforming the stream data. The execution plan generation module 525 generates 704 a dataflow graph for executing the transform operation. In some embodiments, the dataflow graph may include a sequence of database queries. To generate the dataflow graph, the decomposition module 535 may traverse 706 the database query specification to determine whether the database query specification includes one or more operations from a predefined set of operations. Responsive to determining that the database query includes an operation from the predefined set of operations, the decomposition module 535 may decompose 708 the database query a first database query and a second database query. In some implementations, the first database query generates an intermediate results table, and the decomposition module 535 stores data determined based on the operation in the intermediate results table. The second database query receives as input the intermediate results table and outputs data used for performing the transform operation of the ETL operation. The execution module 560 may receive 710 stream data from a source and execute 712 the sequence of database queries of the dataflow graph for performing the transform operation on the stream data received from the source.

In some embodiments, the query processing module 320 may receive ETL specification for processing stream data. The ETL specification may include a transformation operation. In some implementations, the transformation operation is represented using at least a database query (e.g., a SQL query) specification for transforming the stream data. The execution plan generation module 525 may generate a dataflow graph for executing the transformation operation. For example, the dataflow graph may include database queries obtained by decomposing one or more database queries specified in the ETL specification. The execution module 560 may execute the database queries of the dataflow graph for stream data for the stream data received from a data source to determine an output result. The query processing module 320 may receive modified ETL specification, and the modified ETL specification includes at least a modified database query that corresponds to a database query specified in the ETL specification before modification (e.g., an initial database query specified in the initial ETL specification). In some embodiments, the execution plan generation module 525 may compare the modified database query to the corresponding initial database query specified in the initial ETL specification (which is the ETL specification before modification). The execution plan generation module 525 may determine based on the comparison that at least a portion of the output result previously computed may be reused to determine an output result of new stream data received from the data source.

Microarchitecture-Based Runtime Execution of ETL Specification

Figure 8:
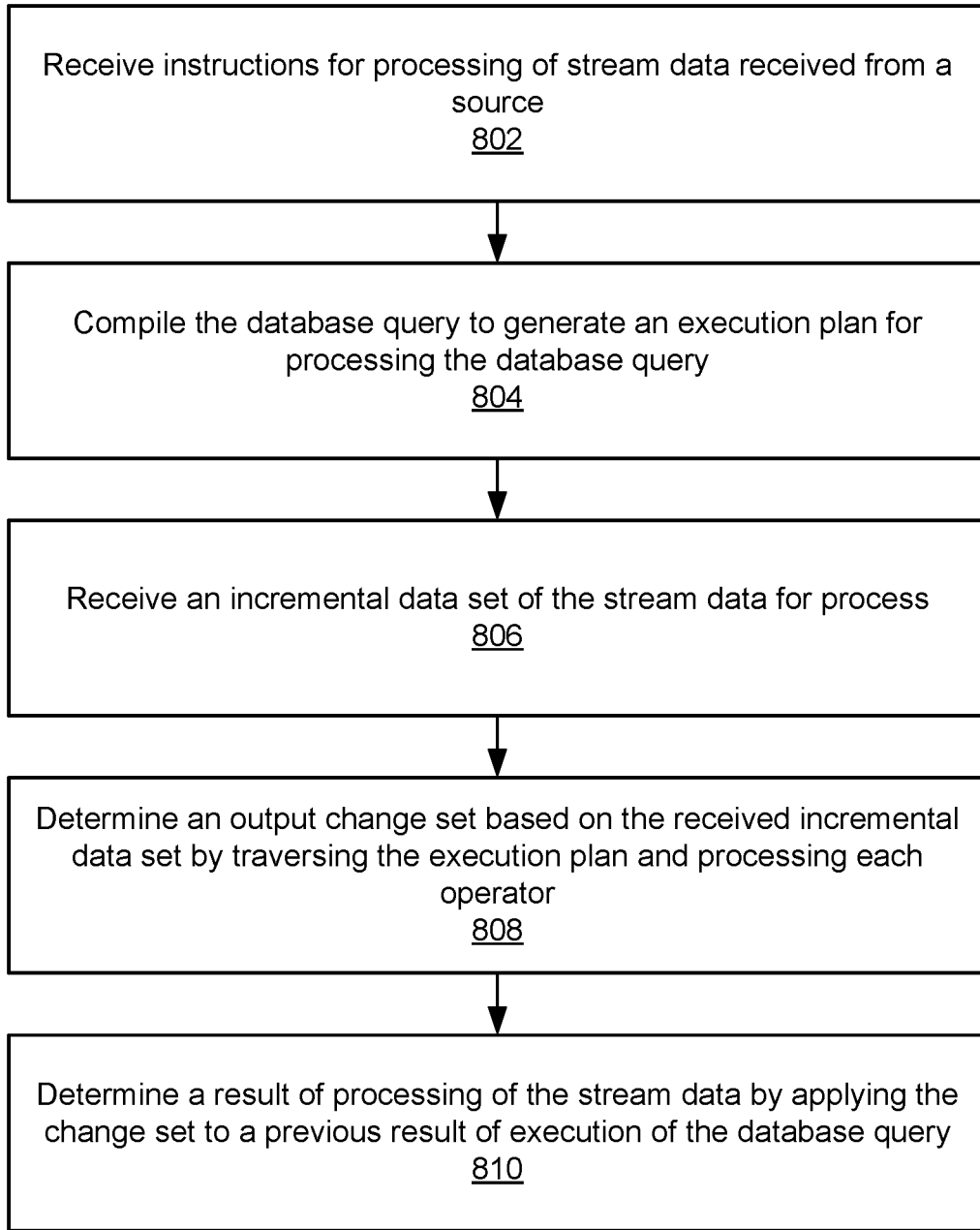
FIG. 8 is a flowchart of a method for a microarchitecture-based runtime execution of ETL specification, in accordance with an embodiment.

FIG. 8 is a flowchart of a method for a microarchitecture-based runtime execution of ETL specification, in accordance with an embodiment. The process shown in FIG. 8 may be performed by one or more components (e.g., the control layer 106) of a data processing system/service (e.g., the data processing service 102). Other entities may perform some or all of the steps in FIG. 8. The data processing service 102 as well as the other entities may include some or of the component of the machine (e.g., computer system) described in conjunction with FIG. 9. Embodiments may include different and/or additional steps, or perform the steps in different orders.

In some embodiments, the microarchitecture-based runtime execution of ETL specification may be based on SQL queries used for specifying the transform operation of the ETL operation. The query processing module 320 may receive 802 instructions for processing of stream data received from a source. In some embodiments, the instructions may include at least a command specified using a database query. The execution plan generation module 525 may compile 804 the database query to generate an execution plan for processing the database query. In some embodiments, the execution plan may represent a graph of a set of operators. The execution module 560 may receive 806 an incremental data of the stream data for processing and determines 808 an output change set based on the received incremental data set by traversing the execution plan and processing each operator. In some embodiments, when processing a particular operator of the set of operators, the execution module 560 may receive change sets output by one or more other operators of the set of operators as input and computes the change set of the particular operator from the change sets output by the one or more other operators. The execution module 560 may determine 808 a result of processing of the data stream by applying the change set to a previous result of execution of the database query.

Computer Architecture

Figure 9:
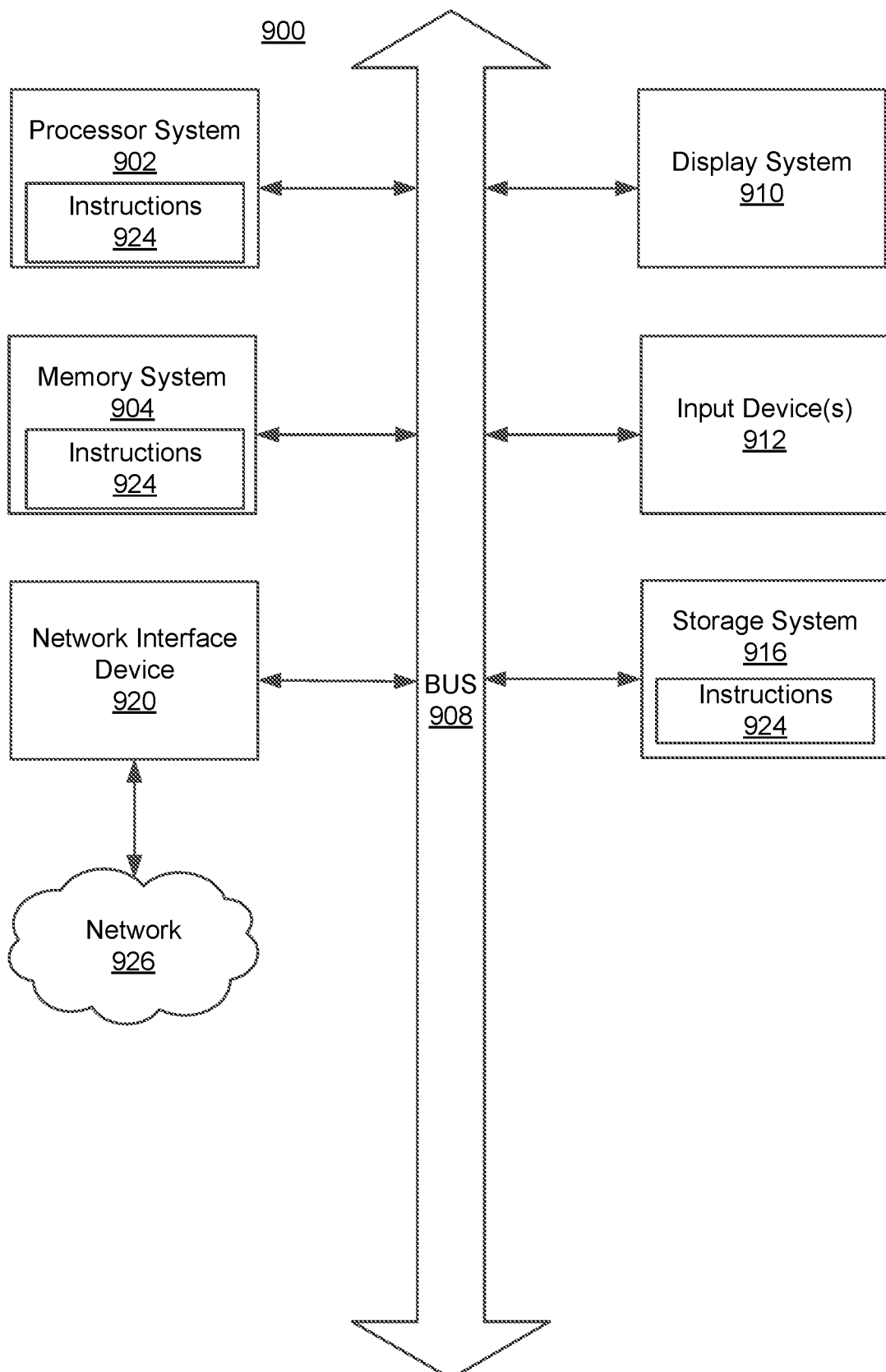
FIG. 9 illustrates an example computing machine for reading and executing computer-readable instructions, in accordance with an embodiment.

Turning now to FIG. 9, illustrated is an example machine to read and execute computer readable instructions, in accordance with an embodiment. Specifically, FIG. 9 shows a diagrammatic representation of the data processing service 102 (and/or data processing system) in the example form of a computer system 900. The computer system 900 is structured and configured to operate through one or more other systems (or subsystems) as described herein. The computer system 900 can be used to execute instructions 924 (e.g., program code or software) for causing the machine (or some or all of the components thereof) to perform any one or more of the methodologies (or processes) described herein. In executing the instructions, the computer system 900 operates in a specific manner as per the functionality described. The computer system 900 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 900 may be a server computer, a client computer, a personal computer (PC), a tablet PC, a smartphone, an internet of things (IoT) appliance, a network router, switch or bridge, or other machine capable of executing instructions 924 (sequential or otherwise) that enable actions as set forth by the instructions 924. Further, while only a single machine is illustrated, the term "machine" shall also be taken to include any collection of machines that individually or jointly execute instructions 924 to perform any one or more of the methodologies discussed herein.

The example computer system 900 includes a processing system 902. The processor system 902 includes one or more processors. The processor system 902 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor system 902 executes an operating system for the computing system 900. The computer system 900 also includes a memory system 904. The memory system 904 may include or more memories (e.g., dynamic random access memory (RAM), static RAM, cache memory). The computer system 900 may include a storage system 916 that includes one or more machine readable storage devices (e.g., magnetic disk drive, optical disk drive, solid state memory disk drive).

The storage unit 916 stores instructions 924 (e.g., software) embodying any one or more of the methodologies or functions described herein. For example, the instructions 924 may include instructions for implementing the functionalities of the transaction module 330 and/or the file management module 320. The instructions 924 may also reside, completely or at least partially, within the memory system 904 or within the processing system 902 (e.g., within a processor cache memory) during execution thereof by the computer system 900, the main memory 904 and the processor system 902 also constituting machine-readable media. The instructions 924 may be transmitted or received over a network 926, such as the network 926, via the network interface device 920.

The storage system 916 should be taken to include a single medium or multiple media (e.g., a centralized or distributed database, or associated caches and servers communicatively coupled through the network interface system 920) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 900 can include a display system 910. The display system 910 may driver firmware (or code) to enable rendering on one or more visual devices, e.g., drive a plasma display panel (PDP), a liquid crystal display (LCD), or a projector. The computer system 900 also may include one or more input/output systems 912. The input/output (IO) systems 912 may include input devices (e.g., a keyboard, mouse (or trackpad), a pen (or stylus), microphone) or output devices (e.g., a speaker). The computer system 900 also may include a network interface system 920. The network interface system 920 may include one or more network devices that are configured to communicate with an external network 926. The external network 926 may be a wired (e.g., ethernet) or wireless (e.g., WiFi, BLUETOOTH, near field communication (NFC).

The processor system 902, the memory system 904, the storage system 916, the display system 910, the IO systems 912, and the network interface system 920 are communicatively coupled via a computing bus 908.

ADDITIONAL CONSIDERATIONS

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A computer implemented method for performing extract, transform, and load (ETL) of data, comprising:
   receiving ETL specification for performing an ETL operation that extracts data from an external system, transforms the extracted data using a database query and loads the data in a destination table;
   compiling the database query comprising:
      traversing the database query to determine whether the database query includes an incremental operation from a set of predefined incremental operations,
      decomposing the database query into a sequence of decomposed database queries, wherein the sequence of decomposed database queries is determined based on the incremental operation included in the database query, and
      generating an execution plan for processing the sequence of decomposed database queries, the execution plan representing a graph of a set of operators;
   extracting an incremental data set from the external system;
   executing the execution plan comprising, determining an output change set based on the received incremental data set by traversing the execution plan and processing each operator, wherein processing of a particular operator that receives inputs of one or more operators comprises:
      receiving change sets output by one or more other operators as input, and
      computing the change set of the particular operator from the change sets output by the one or more other operators; and
   loading in the destination table, a result of processing the incremental data extracted from the external system by applying the change set to a previous result of execution of the database query.

2. The computer implemented method of claim 1, wherein the incremental operation included in the database query represents a partition-based dataflow, and determining the output change set comprises:
   receiving the incremental data set as input to a first operator;
   computing a change set output by the first operator from the incremental data set; and
   adding the change set to a previous result of execution of the first operator.

3. The computer implemented method of claim 1, wherein the incremental operation included in the database query represents an append-only dataflow, and determining the output change set comprises:
   receiving the incremental data set as input to a first operator;
   computing a change set output by the first operator from the incremental data;
   adding the change set to a previous result of executing the first operator to generate an updated result of execution of the first operator;
   receiving the updated result by at least one other operator as input; and
   computing a change set of the at least one other operator from the updated result.

4. The computer implemented method of claim 1, wherein the incremental operation included in the database query represents a row identifier based dataflow, and determining the output change set comprises:
   receiving the incremental data set as input to a first operator;
   determining whether the incremental data set and a previous result of execution of the first operator have a matched row identifier; and
   merging, responsive to determining the matched row identifier between the incremental data set and the previous result of execution of the first operator, data corresponding to the matched row identifier in the incremental data set to data corresponding to the matched row identifier in the previous result of execution of the first operator.

5. The computer implemented method of claim 4, further comprising:
   responsive to determining no matched row identifier between the incremental data set and the previous result of execution of the first operator, adding data corresponding to the matched row identifier in the incremental data set to a new row in the previous result of execution of the first operator.

6. The computer implemented method of claim 1, wherein determining an output change set based on the received incremental data comprises:
   recursively performing the set of operators on the incremental data set to obtain the result of processing of the ETL specification.

7. The computer implemented method of claim 1, wherein the database query is specified in a structured query language (SQL).

8. A non-transitory computer readable storage medium comprising stored program code, the program code comprising instructions, the instructions when executed by one or more computer processors cause the one or more computer processors to:
   receive extract, transform, and load (ETL) specification for performing an ETL operation that extracts data from an external system, transforms the extracted data using a database query and loads the data in a destination table;
   compile the database query wherein instructions to compile the database query cause the one or more computer processors to:
      traverse the database query to determine whether the database query includes an incremental operation from a set of predefined incremental operations, decompose the database query into a sequence of decomposed database queries, wherein the sequence of decomposed database queries is determined based on the incremental operation included in the database query, and generate an execution plan for processing the database query, the execution plan representing a graph of a set of operators;

extract an incremental data set from the external system;

executing the execution plan to determine an output change set based on the received incremental data set by traversing the execution plan and processing each operator, wherein processing of a particular operator that receives inputs of one or more operators comprises:

receive change sets output by one or more other operators as input, and compute the change set of the particular operator from the change sets output by the one or more other operators; and load in the destination table, a result of processing the incremental data extracted from the external system by applying the change set to a previous result of execution of the database query.

9. The non-transitory computer readable storage medium of claim 8, wherein the incremental operation included in the database query represents a partition-based dataflow, and the instructions that cause the one or more computer processors to determine the output change set, when executed cause the one or more computer processors to:

receive the incremental data set as input to a first operator;

compute a change set output by the first operator from the incremental data set; and add the change set to a previous result of execution of the first operator.

10. The non-transitory computer readable storage medium of claim 8, wherein the incremental operation included in the database query represents an append-only dataflow, and the instructions that cause the one or more computer processors to determine the output change set, when executed cause the one or more computer processors to:

receive the incremental data set as input to a first operator;

compute a change set output by the first operator from the incremental data;

add the change set to a previous result of executing the first operator to generate an updated result of execution of the first operator;

receive the updated result by at least one other operator as input; and compute a change set of the at least one other operator from the updated result.

11. The non-transitory computer readable storage medium of claim 8, wherein the incremental operation included in the database query represents a row identifier based dataflow, and the instructions that cause the one or more computer processors to determine the output change set, when executed cause the one or more computer processors to:

receive the incremental data set as input to a first operator;

determine whether the incremental data set and a previous result of execution of the first operator have a matched row identifier; and merge, responsive to determining the matched row identifier between the incremental data set and the previous result of execution of the first operator, data corresponding to the matched row identifier in the incremental data set to data corresponding to the matched row identifier in the previous result of execution of the first operator.

12. The non-transitory computer readable storage medium of claim 11, wherein the instructions, when executed cause the one or more computer processors to:

responsive to determining no matched row identifier between the incremental data set and the previous result of execution of the first operator, add data corresponding to the matched row identifier in the incremental data set to a new row in the previous result of execution of the first operator.

13. The non-transitory computer readable storage medium of claim 8, wherein the instructions that cause the one or more computer processors to determine an output change set based on the received incremental data, when executed the one or more computer processors to:

recursively perform the set of operators on the incremental data set to obtain the result of processing of the ETL specification.

14. The non-transitory computer readable storage medium of claim 8, wherein the database query is specified in a structured query language (SQL).

15. A computer system, comprising:

one or more computer processors; and a non-transitory computer-readable storage medium for storing instructions that when executed by the one or more computer processors cause the one or more computer processors to:

receive extract, transform, and load (ETL) specification for performing an ETL operation that extracts data from an external system, transforms the extracted data using a database query and loads the data in a destination table;

compile the database query wherein instructions to compile the database query cause the one or more computer processors to:

traverse the database query to determine whether the database query includes an incremental operation from a set of predefined incremental operations, decompose the database query into a sequence of decomposed database queries, wherein the sequence of decomposed database queries is determined based on the incremental operation included in the database query, and generate an execution plan for processing the database query, the execution plan representing a graph of a set of operators;

extract an incremental data set from the external system;

executing the execution plan to determine an output change set based on the received incremental data set by traversing the execution plan and processing each operator, wherein processing of a particular operator that receives inputs of one or more operators comprises:

receive change sets output by one or more other operators as input, and compute the change set of the particular operator from the change sets output by the one or more other operators; and determine load in the destination table, a result of processing the incremental data extracted from the external system by applying the output change set to a previous result of execution of the database query.

16. The computer system of claim 15, wherein the incremental operation included in the database query represents a partition-based dataflow, and the instructions that cause the one or more computer processors to determine the output change set, when executed cause the one or more computer processors to:
- receive the incremental data set as input to a first operator;
- compute a change set output by the first operator from the incremental data set; and
- add the change set to a previous result of execution of the first operator.

17. The computer system of claim 15, wherein the incremental operation included in the database query represents an append-only dataflow, and the instructions that cause the one or more computer processors to determine the output change set, when executed cause the one or more computer processors to:
- receive the incremental data set as input to a first operator;
- compute a change set output by the first operator from the incremental data;
- add the change set to a previous result of executing the first operator to generate an updated result of execution of the first operator;
- receive the updated result by at least one other operator as input; and
- compute a change set of the at least one other operator from the updated result.

18. The computer system of claim 15, wherein the incremental operation included in the database query represents a row identifier based dataflow, and the instructions that cause the one or more computer processors to determine the output change set, when executed cause the one or more computer processors to:
- receive the incremental data set as input to a first operator;
- determine whether the incremental data set and a previous result of execution of the first operator have a matched row identifier; and
- merge, responsive to determining the matched row identifier between the incremental data set and the previous result of execution of the first operator, data corresponding to the matched row identifier in the incremental data set to data corresponding to the matched row identifier in the previous result of execution of the first operator.

19. The computer system of claim 18, wherein the instructions, when executed cause the one or more computer processors to:
- responsive to determining no matched row identifier between the incremental data set and the previous result of execution of the first operator, add data corresponding to the matched row identifier in the incremental data set to a new row in the previous result of execution of the first operator.

20. The computer system of claim 15, wherein the instructions that cause the one or more computer processors to determine an output change set based on the received incremental data, when executed cause the one or more computer processors to:
- recursively perform the set of operators on the incremental data set to obtain the result of processing of the ETL specification.

* * * * *